April 20, 1937.   E. H. LAND   2,078,181
DEVICE EMPLOYING POLARIZED LIGHT
Filed Aug. 27, 1935
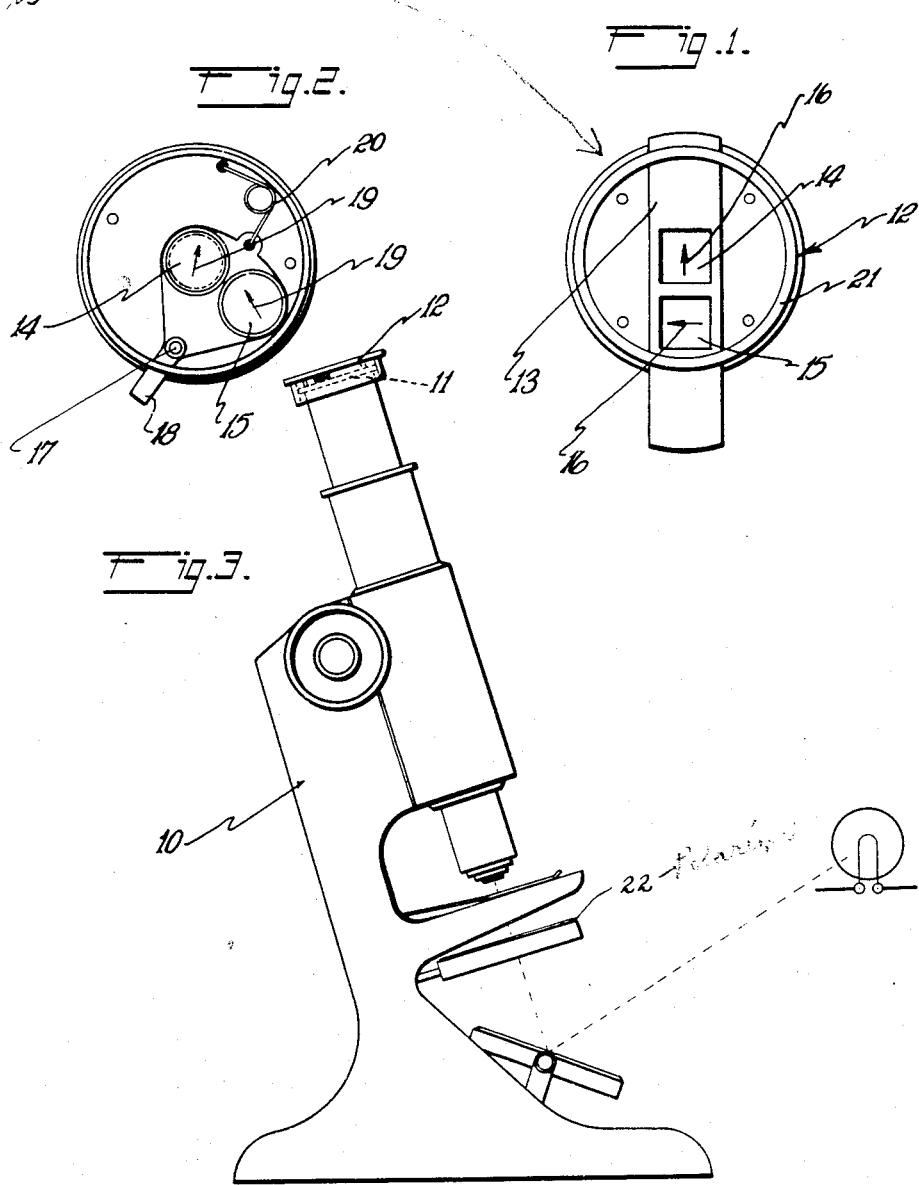
INVENTOR
Edwin H. Land
BY
Donald L. Brown
ATTORNEY Patented Apr. 20, 1937

2,078,181

UNITED STATES PATENT OFFICE 2,078,181

DEVICE EMPLOYING POLARIZED LIGHT

Edwin H. Land, Wellesley Farms, Mass., assignor to Sheet Polarizer Company, Inc., Union City, N. J., a corporation of New Jersey Application August 27, 1935, Serial No. 38,086

11 Claims. (Cl. 88—40)

This invention relates to new and improved optical systems employing polarized light and more particularly to viewing devices such as microscopes and the like.

An object of the invention is to provide an optical system wherein the object viewed is illuminated by polarized light and wherein means are employed for rapidly and precisely altering through a predetermined angle the plane of polarization of light transmitted by either the polarizer or the analyzer; to provide in such a system means comprising a plurality of closely adjacent polarizing areas for accomplishing the desired result; to provide such means in the form of an attachment adapted to function closely adjacent the eye piece of a viewing instrument such as a microscope, and to provide such an attachment as may be readily applied to the viewing device, economically manufactured and readily operated.

Another object of the invention is to provide in an optical system employing a polarizer and an analyzer supplemental means associated with either the polarizer or the analyzer for effecting rapid and precise alteration without rotation through intermediate angles of the plane of polarization of light transmitted thereby.

A still further object of the invention is to provide an attachment of the character described which may also permit rotation of the analyzer or polarizer, before displacement thereof by an adjacent polarizing area adapted to polarize the transmitted beam in a plane at right angles to the plane of polarization of the displaced area.

A still further object of the invention is to provide in connection with such an attachment means adapted to prevent the attachment from maintaining an intermediate position with the eye lens covered in part by one of the adjacent polarizing areas and in part by the other.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a more complete understanding of the invention reference should be had to the following detailed description taken in connection with the accompanying drawing, in which:

Figure 1 is a somewhat diagrammatic view of an attachment embodying one form of the invention;

Figure 2 is a similar view of a modified form of the device embodying the invention, and Figure 3 is a somewhat diagrammatic view in elevation of a microscope embodying one form of the invention.

It is desirable in optical systems employing polarized light and in viewing devices such as microscopes and the like where polarized light is employed, to effect an alteration in the plane of polarization, usually through an angle of 90°, whereby for example, a doubly refracting object may be viewed alternately in precise complementary colors. This is of particular importance because the eye of an observer becomes fatigued and loses its color sensitivity at the same time acquiring increased color sensitivity for the complementary colors to those viewed. Because of this fact a rapid and accurate alteration of the field of view to its complementary color pattern results in a great increase in the apparent brilliance of the color and detail of the field. In order to utilize this effect properly it is highly desirable that there be no intermediate positions of the plane of polarization and secondly, that the alteration be accurately a 90° alteration. Furthermore it is highly desirable that the alteration of the position of the plane of polarization be effected rapidly.

This invention contemplates the use of a polarizing attachment comprising for example a slide in which two light polarizing areas are mounted with their polarizing axes positioned at right angles to each other, the slide comprising closely adjacent preferably thin sheet-like polarizing areas which may abut directly against each other or may comprise a unitary piece. Each of the polarizing areas is preferably of such size and shape as completely to cover the eye-piece of the microscope or other viewing device with which the attachment may be employed. It is desirable that the polarizing areas employed, where the device is used adjacent the eye-piece of the viewing device, be as thin as possible so that the use of the attachment will not affect the position of the eye of the observer with respect to the eye-piece of the instrument.

In connection with the slide or other device embodying this invention it may be desirable to supply means, for example mechanical means such as a spring, or magnetic means to insure that the slide or other device does not stop with a portion of each of the polarizing elements employed therein overlying the eye-piece of the viewing device with which it is employed. To that end the mechanical or other constraint associated with the device may be designed to insure that once the device has been moved to partially displace one of the polarizing areas from its position adjacent the eye-piece, the device will continue to move until the second polarizing area completely covers the eye-piece.

While the device has been referred to herein as preferably positioned adjacent the eye-piece of the microscope or other viewing device with which it may be employed it is to be understood that it may be positioned anywhere else within the optical system with which it is associated where its function is not impaired.

For example, the device may be positioned to function in a sub-stage of the microscope with which it is employed even though its operation in that position may be somewhat more difficult than when positioned adjacent the eye-piece, or it may be positioned between the eye-piece and the objective.

It should be understood furthermore that while the device has been described herein as used in connection with microscopes and similar viewing instruments, it may be advantageously employed in other fields, for example in cases where the polarized beam is projected.

Furthermore, it is to be understood that the device is useful not only with plane polarized light but also with elliptically polarized light and circularly polarized light. In my co-pending application Serial No. 714,239 filed March 6, 1934 there is disclosed suitable circular polarizers for use in devices embodying this invention. They may comprise for example closely adjacent sheets of light polarizing material such as has been above described and a quarter wave plate positioned with its optical axes at angles of 45 degrees to the polarizing axis of the polarizing sheet. Where such circular polarizers are employed alteration of the direction of rotation of the polarized beam in the desired manner may be accomplished by employing a fixed quarter wave plate with slidable right-angularly positioned plane polarizing elements adjacent said plate, or by employing a fixed plane polarizing element with suitable right-angularly positioned quarter wave plate adjacent said element or by employing two adjacent complete circular polarizing units.

It is frequently desirable that the polarizing sheet or area of the plurality of adjacent areas comprising the device or attachment embodying this invention which overlies the eye-piece of the viewing device or which intersects the light beam in the optical system be rotated to alter the position of its plane of polarization. It is contemplated therefore that the combined plurality or pair of polarizing areas employed in this invention may be provided with mounting means permitting rotation of the plurality or pair as a unit so that that one of the plurality or pair which overlies the eye-piece or intersects the light may be adjusted and the position of its polarizing axis altered.

In the embodiment of the invention shown in the accompanying drawing, which is intended to illustrate a specific application of the invention to a microscope 10 represents generally a polarizing microscope utilizing the invention. Adjacent the eye-piece of the microscope 11 there is provided an attachment 12 comprising a frame 13 and a pair of adjacent light polarizing areas 14 and 15. As shown in the drawing the polarizing axes of these two areas represented by the arrows 16 are at right angles to each other. Each of the polarizing areas 14 and 15 are of such size at least as to completely cover the eye lens of the microscope. Associated with the microscope is a light-polarizing element shown generally at 22 adapted to cooperate with the analyzing eye-piece and so positioned preferably that its polarizing axis will be parallel to the polarizing axis of one of the light-polarizing areas in the eye-piece attachment and at right angles to the polarizing axis of the other such area when the areas are in operative position. While any suitable light-polarizer may be employed both as the polarizing element and as the analyzer, it is to be understood that a sheet-like polarizer, such for example as a suspension of polarizing particles optically oriented in a transparent set plastic, suitably mounted between sheets of glass, is to be preferred.

In the device shown in Fig. 1, the attachment comprises a straight strip made up of a pair of adjacent right angularly positioned polarizing areas. The area 14 is shown as overlying the eye-piece of the microscope. If it is desired to displace the area 14 by the area 15 and thus abruptly alter the position of the polarizing axis of the effective area of the eye-piece attachment it is only necessary to push the area 15 into proper position overlying the eye-piece. Since the two areas are movable as a unit this action displaces the area 14 which becomes no longer effective.

In the modification of the invention shown in Fig. 2, the adjacent areas are mounted so as to pivot about the point 17. This pivoting action may be effected if desired through the lever or similar element 18. In this embodiment of the invention the polarizing axes of the respective adjacent light polarizing areas are shown as by the arrows 19 to be so positioned that when the area 15 is substituted for the displaced area 14 over the eye-piece of the microscope its plane of polarization will be positioned at right angles to the plane of polarization of the displaced area when it was in operative position.

Means are shown as at 20 to facilitate the substitution of one polarizing area for the other and to insure complete displacement of one area by the other. In the invention shown in Fig. 2, this means comprises a spring so positioned as to resist any position of the attachment save one wherein the eye-piece of the microscope is completely covered by one only of the adjacent polarizing areas. It will be obvious that other means than spring means may be employed to effect this result; for example in certain optical systems magnetic means or electromagnetic means might be employed positioned to firmly hold the plurality of adjacent polarizing areas in position such that one only of the areas was in effective operable position.

Where the pivoting type of attachment such as shown in Fig. 2 is employed it is to be understood that the adjacent polarizing areas referred to may actually comprise a single sheet of polarizer of such size and so positioned that as portions of it are swung into operable position adjacent the eye-piece of the viewing device the plane of polarization of the operable portion of the sheet is rapidly altered until it is at 90° to the plane of polarization of the operable portion of the sheet in its original position.

In Fig. 1 means 21 are shown to permit rotation of the polarizing areas comprising the attachment as a unit so that the plane of polarization of that area overlying the eye-piece of the microscope may be rotated.

The operation of the device will generally be understood from the preceding description. After the polarizer adjacent the eye-piece of the microscope has been adjusted so that its polarizing axis is in a preferred position the plane of polarization of the beam transmitted by the device may be rapidly and repeatedly altered through an angle 90° if desired so that the object viewed may be observed in its complementary color patterns. This alteration may be effected by simply flipping the attachment back and forth so that first Since certain changes may be made in the above article and different embodiments of the invention could be made without departing from the scope thereof it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. An optical system comprising in combination means to polarize a beam of light, means to analyze said polarized beam, one of said means comprising a plurality of closely adjacent light polarizing areas, means adapted to position any one of said areas in the path of said beam and means for rapidly interchanging any other one of said areas with the one in said position, said areas being so positioned that when in position to intercept said beam their polarizing axes are at different predetermined angles one to another.

2. In an optical system employing polarized light, in combination, a light polarizing area interposed in the path of a beam of light, means to displace said area with another polarizing area having its polarizing axis so positioned that when it displaces said first area it effects an alteration in the position of the plane of polarization of the beam transmitted thereby, and means adapted to hold said areas so that the polarizing axis of one of said areas is at a predetermined angle to the polarizing axis of the other of said areas, irrespective of the position of said areas with respect to said beam.

3. In an optical system employing polarized light, in combination, a plurality of adjacent light polarizing areas, means to position said areas so that one of said areas intersects a beam of light, said areas being movable as a unit so that any one thereof may intersect said beam and said areas being so positioned with respect to each other that the polarizing axis of each of said areas is at a predetermined angle from the polarizing axis of each of the other of said areas, and said areas being so positioned that the polarizing axis of any area when in position to intersect the beam is at a predetermined angle from the polarizing axis to each other area when so positioned.

4. In an optical system employing polarized light, in combination, a plurality of adjacent light polarizing areas, means to position said areas so that one of said areas intersects a beam of light, said areas being slidably movable as a unit so that any one thereof may intersect said beam and said areas being so positioned with respect to each other that the polarizing axis of each of said areas is at a predetermined angle from the polarizing axis of each of the other of said areas at all times.

5. In an optical system employing polarized light, in combination, a plurality of adjacent light polarizing areas, means to position said areas so that one of said areas intersects a beam of light, said areas being pivotally movable as a unit so that any one thereof may intersect said beam and said areas being so positioned with respect to each other that the polarizing axis of each of said areas is at a predetermined angle from the polarizing axis of each of the other of said areas at all times.

6. An optical system employing polarized light, comprising in combination means to polarize a beam of light, viewing means positioned to intersect said polarized beam and comprising a pair of closely adjacent light polarizing elements fixedly positioned with respect to each other and movable as a unit, and means for interposing either of said elements in the path of said polarized beam, said elements being so positioned with respect to each other that when interposed in the path of said beam one is adapted to block polarized beams transmitted by the other.

7. In an optical system means for polarizing a beam of light, viewing means comprising a light polarizing element, at least one of said means having closely associated therewith and movable therewith still another light polarizing element, said movable elements being so positioned with respect to each other that when one is substituted for the other it transmits light differently polarized from that transmitted by the element for which it is substituted, said movable elements having their polarizing axes positioned at a predetermined angle to each other and means to facilitate the substitution of one of said elements for the other.

8. In an optical system means for polarizing a beam of light, viewing means comprising a light polarizing element, at least one of said means having closely associated therewith and movable therewith still another light polarizing element positioned with its polarizing axis at a predetermined angle to the polarizing axis of said means whereby when it is substituted therefore it transmits light differently polarized from that transmitted by the element for which it is substituted, and spring means to facilitate the substitution of one of said elements for the other.

9. An attachment for the ocular of a polarizing microscope comprising a plurality of adjacent light polarizing areas movable as a unit, means to position said areas so that one only overlies the eye lens, means for substituting any of said areas for said one, said areas being so positioned with respect to each other that the polarizing axis of any one is at a predetermined angle to the polarizing axis of any other when positioned to overlie said eye-piece.

10. An attachment for the ocular of a polarizing microscope comprising a plurality of adjacent light polarizing areas slidably movable as a unit, means to position said areas so that one only overlies the eye lens, means for substituting any of said areas for said one, said areas being so positioned with respect to each other that the polarizing axis of any one is at a predetermined angle to the polarizing axis of any other when positioned to overlie said eye-piece.

11. An attachment for the ocular of a polarizing microscope comprising a plurality of adjacent light polarizing areas pivotally movable as a unit, means to position said areas so that one only overlies the eye lens, means for substituting any of said areas for said one, said areas being so positioned with respect to each other that the polarizing axis of any one is at a predetermined angle to the polarizing axis of any other when positioned to overlie said eye-piece.

EDWIN H. LAND.